United States Patent [19]

Tanaka et al.

[11] Patent Number: 4,875,121
[45] Date of Patent: Oct. 17, 1989

[54] MAGNETIC HEAD SUPPORTING DEVICE

[75] Inventors: Yoshito Tanaka; Nobuhiro Umebayashi, both of Ibaraki, Japan

[73] Assignee: Hitachi Maxell, Ltd., Ibaraki, Japan

[21] Appl. No.: 47,154

[22] Filed: May 8, 1987

[30] Foreign Application Priority Data

May 12, 1986 [JP] Japan .................. 61-109161

[51] Int. Cl.⁴ .................. G11B 5/56; G11B 21/24
[52] U.S. Cl. .................. 360/129; 362/105; 362/107
[58] Field of Search .................. 360/103, 105, 97–99, 360/104, 107, 109

[56] References Cited

U.S. PATENT DOCUMENTS

| | | | |
|---|---|---|---|
| 3,581,298 | 5/1971 | Billawala | 360/103 |
| 3,668,668 | 6/1972 | Robitschek | 360/103 |
| 4,120,010 | 10/1978 | Mitsuya et al. | 360/105 X |
| 4,379,316 | 4/1983 | Krane | 360/105 |
| 4,709,285 | 11/1987 | Enami et al. | 360/105 X |
| 4,710,836 | 12/1987 | Hish | 360/105 X |

Primary Examiner—John H. Wolff
Attorney, Agent, or Firm—Antonelli, Terry & Wands

[57] ABSTRACT

A magnetic head supporting device for supporting at least one magnetic head in contact with a flexible magnetic disk so as to record and reproduce signals in and from the flexible magnetic disk. The magnetic head supporting device comprises a gimbal spring having a central portion to which the magnetic head is secured at one side thereof; and a pivot which contacts on the opposite side of the central portion of the gimbal spring so as to support the center of the magnetic head through the intermediary of the gimbal spring. The gimbal spring includes an intermediate frame portion which supports the central portion in such a manner as to impart thereto a degree of freedom of rotation in the circumferential direction or in the radial direction of the magnetic disk, and an outer holding portion which supports the intermediate frame portion in such a manner as to impart thereto a degree of freedom of rotation in the direction perpendicular to the direction of freedom of rotation imparted by the intermeidate frame portion to the central portion. The width of parts of the intermediate frame portions extending in parallel to the direction of running of the surface of the magnetic disk, as measured in the direction perpendicular to the running direction, is determined to be smaller in the upstream portion of the intermediate frame portion than in the downstream portion of the same as viewed in the direction of running of the surfacae of the magnetic disk.

4 Claims, 3 Drawing Sheets

MAGNETIC HEAD SUPPORTING DEVICE

BACKGROUND OF THE INVENTION

1. Field of the Invention

The present invention relates to a magnetic head supporting device for supporting magnetic heads in an apparatus for recording and reproducing information on and from a flexible magnetic disk. More particularly, the present invention is concerned with the construction of a gimbal spring incorporated in the magnetic head supporting device of the kind described above.

2. Description of the Prior Art

FIG. 3 shows the construction of a known magnetic head supporting device used in a conventional flexible magnetic disk recording and reproducing apparatus. Gimbal springs 6 and 7 to which magnetic heads 4 and 5 are secured are attached to ends of a stationary base member 1 and a movable base member 2. Pivots 8 and 9 project from the stationary base member 1 and the movable base member 2 so as to be pressed onto the centers of the rear surfaces of the gimbal springs 6 and 7. More specifically, the pivots 8 and 9 support, through the intermediaries of the gimbal springs 6 and 7, the centers of the rear surfaces of the magnetic heads 4 and 5 so as to prevent any positional offset of the magnetic heads 4 and 5. The spring 3 constitutes a fulcrum which enables the movable base member 3 to swing up and down. A reference numeral 10 denotes a pressurizing spring acting between a spring retainer 11 fixed to the stationary base member 1 and the movable base member 2 so as to resiliently press the movable base member 2 towards the stationary base member 1, whereby the magnetic heads 4 and 5 are pressed onto both sides of a flexible magnetic disk 12.

FIG. 4 is a plan view illustrating the positional relationship between the gimbal spring, magnetic head and the pivot on the movable base member. It should be noted, however, that the illustrated positional relationship may be applied also to the members associated with the stationary base member. The magnetic head 5 is disposed on the center of the gimbal spring 7, while the pivot 9 presses the center G of the rear surface of the magnetic head 5 through the gimbal spring 7. The gimbal spring 7 is formed from a thin sheet of a resilient material by punching or etching. As will be seen from FIG. 4, the gimbal spring has a central rectangular portion a connected to an intermediate rectangular frame portion through narrow bridge portions c and an outer holder portion d which is connected to the intermediate frame portion b through narrow bridge portions e which are perpendicular to the bridge portions c. With this arrangement, the central rectangular portion a can slightly pitch and roll with respect to the outer holding portion d. In FIG. 4, an arrow A indicates the direction in which the magnetic disk runs. Thus, the central rectangular portion a can pitch in the direction of running of the rotary disk, i.e., about an axis X—X, and roll also in the radial direction of the disk, i.e., about an axis Y—Y. Specifically, in the arrangement shown in FIG. 4, the central rectangular portion a has a degree of freedom of rotation in the circumferential direction of the disk with respect to the intermediate rectangular frame b which in turn has a degree of freedom of rotation in the radial direction of the disk with respect to the outer holding portion d. This arrangement, however, may be reversed such that the central rectangular portion a has a degree of freedom of rotation in the radial direction of the disk with respect to the intermediate rectangular frame b which in turn has a degree of freedom of rotation in the circumferential direction of the disk with respect to the outer holding portion d, as shown in FIG. 5.

When the magnetic disk runs in the direction of an arrow A in FIG. 6, a force shown by an arrow F is produced along the surface of the magnetic disk due to friction between the surface of the magnetic head 5 and the surface of the magnetic disk, causing the magnetic head 5 to be inclined in the direction of running of the surface of the magnetic disk, as shown in FIG. 6 in a somewhat exaggerated manner for an easier understanding. This inclination causes the magnetic head 5 to contact with the magnetic disk 12 at the upstream end, i.e., at the left end as viewed in FIG. 6. In consequence, the state of contact between the magnetic head and the magnetic disk is rendered unstable, resulting in various problems such as deterioration in the electromagnetic conversion characteristics and damages in the magnetic disk.

SUMMARY OF THE INVENTION

Accordingly, an object of the present invention is to provide a magnetic head supporting device which is capable of ensuring stable contact between the magnetic heads and the magnetic disk, thereby overcoming the abovedescribed problems of the prior art.

To this end, according to the present invention, there is provided a magnetic head supporting device for supporting at least one magnetic head in contact with a flexible magnetic disk so as to record and reproduce signals on and from the flexible magnetic disk, comprising: a gimbal spring having a central portion to which the magnetic head is secured; and a pivot which contacts on the opposite side of the central portion of the gimbal spring so as to support the center of the magnetic head through the intermediary of the gimbal spring; wherein the gimbal spring includes an intermediate frame portion which supports the central portion in such a manner as to impart thereto a degree of freedom of rotation in the circumferential direction or in the radial direction of the magnetic disk, and an outer holding portion which supports the intermediate frame portion in such a manner as to impart thereto a degree of freedom of rotation in the direction perpendicular to the direction of freedom of rotation imparted by the intermediate frame portion to the central portion, the width of parts of the intermediate frame portions extending in parallel to the direction of running of the surface of the magnetic disk, as measured in the direction perpendicular to the running direction, is determined to be smaller in the upstream part of the intermediate frame portion than in the downstream part of the same as viewed in the direction of running of the surface of the magnetic disk.

The above and other objects, features and advantages of the present invention will become clear from the following description of the preferred embodiments when the same is read in conjunction with the accompanying drawings.

DESCRIPTION OF THE PREFERRED EMBODIMENTS

Figure 7:
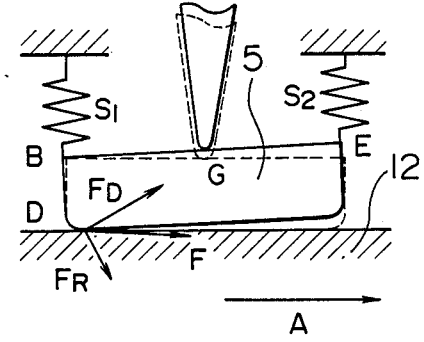
FIG. 7 is an illustration of the behavior of a magnetic head on a magnetic disk.

The behavior of a magnetic disk on the running surface of a magnetic disk will be discussed with specific reference to FIG. 7. The frictional force F is broken into a component FR perpendicular to the line interconnecting the friction point and the pivot point G and a component FD which is parallel to the above-mentioned line, i.e., orthogonal to the component FR. The force component FR acts to rotate the magnetic head 5 about the point G, while the force component FD acts to lift the end of the pivot. In consequence, the pivot is lifted while deflecting the gimbal spring. In this stage, the point D of contact between the magnetic head and the magnetic disk is always on the surface of the magnetic disk. Thus, while the inclination angle is still small, the magnetic head is seemingly rotated about the contact point D such that the end E is lifted above surface of the magnetic disk.

The amount of lift of the end E can be diminished by increasing the strength of a spring $S_2$ which acts on the point E, i.e., on the downstream end of the magnetic head E as viewed in the direction of running of the magnetic disk E.

It is to be understood that the increase in the strength is necessary only for the spring $S_2$ on the downstream end of the magnetic head 5 but is not necessary for the spring $S_1$ which acts on the upstream end of the magnetic head 5.

It would be possible to increase the strengths of both the springs $S_1$ and $S_2$ by, for example, increasing the thickness of the gimbal spring or by increasing the width of the bridge portions c which constitute the X—X axis of rotation. Such a measure, however, increases the rigidity of the gimbal spring as a whole, so that the head cannot well follow-up any oscillation of the surface of the magnetic disk, resulting in an inferior electromagnetic conversion efficiency. Furthermore, the risk for the magnetic disk surface to be damaged by the magnetic head is increased undesirably. However, as explained before, what is necessary is that the strength of only the spring $S_2$ is increased, and any increase in the rigidity of the whole gimbal spring is not necessary.

With this knowledge, the present invention offers an improved magnetic head supporting device having the following features.

Figure 1:
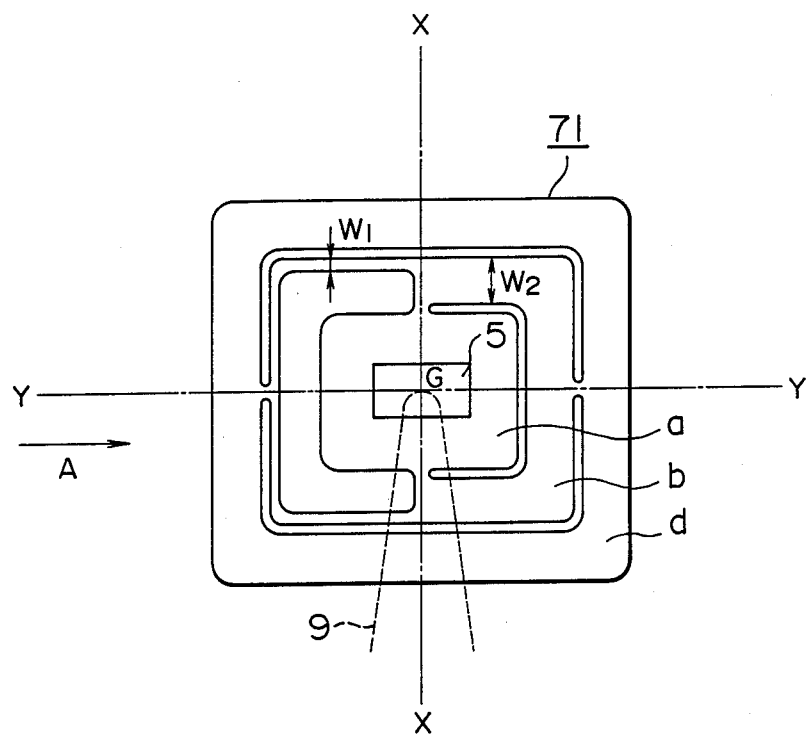
FIG. 1 is a plan view of a gimbal spring incorporated in a magnetic head supporting device in accordance with the present invention.
Figure 3:
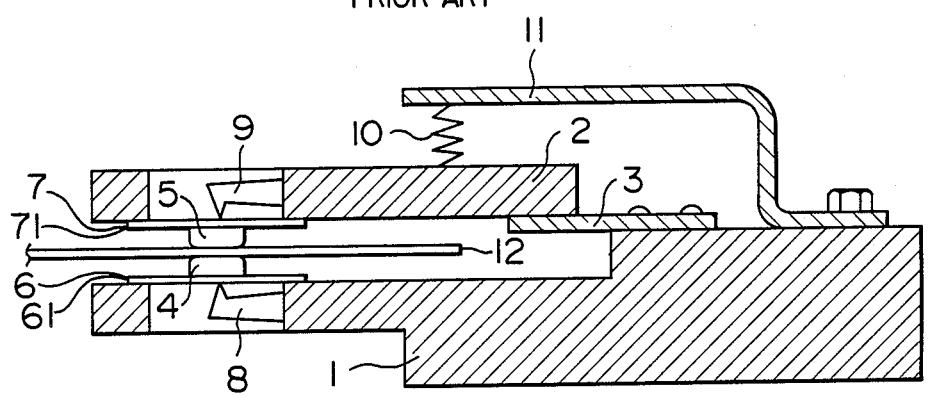
FIG. 3 is an illustration of a conventional magnetic head supporting device.
Figure 4:
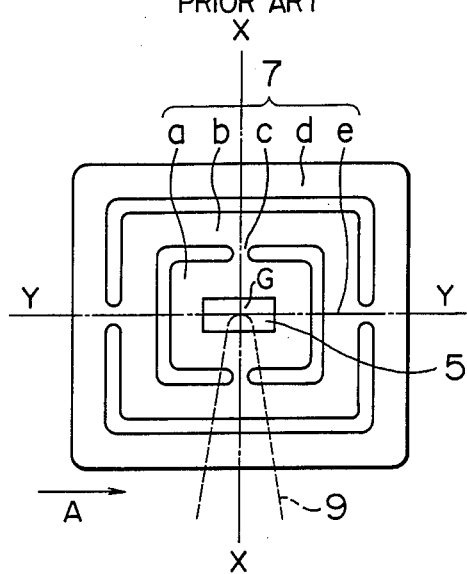
FIGS. 4 and 5 are plan views of known gimbal springs.
Figure 5:
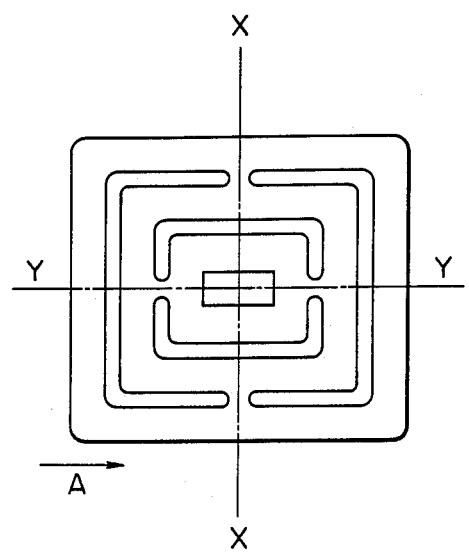
Figure 6:
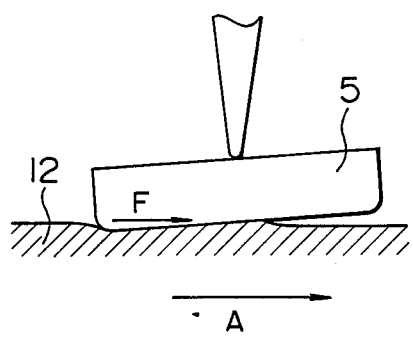
FIG. 6 is an illustration of a problem encountered by a conventional magnetic head supporting device when the same is used in combination with a magnetic disk.

Referring to FIG. 1, there is shown a gimbal spring having a novel construction suitable for use in a magnetic head supporting device in accordance with the present invention. As will be understood from a comparison between FIG. 1 and FIGS. 4 and 5 which show known gimbal springs, the positional relationship between the magnetic head, pivot and the gimbal spring is the same as that in the conventional arrangement. The gimbal spring, which is denoted by a numeral 71 in FIG. 1, is different in construction from the known gimbal spring 7 shown in FIGS. 4 and 5. More specifically, the width $W_2$ of the parts of the intermediate frame portion b parallel to the direction of running of the magnetic disk as measured in the direction perpendicular to the disk running direction in the downstream half part of the intermediate frame member is greater than that $W_1$ in the upstream half part of the intermediate frame portion b. With this arrangement, the central rectangular portion of the gimbal spring exhibits a greater rigidity at its downstream portion than at its upstream portion, whereby the undesirable inclination of the magnetic head with respect to the plane of the magnetic disk is prevented without being accompanied by any increase in the rigidity of the whole gimbal spring, owing to the reduction in the rigidity of the upstream half part of the intermediate frame portion.

In the embodiment shown in FIG. 1, the central rectangular portion a of the gimbal spring is supported by the intermediate frame portion b for rotation about an X—X axis, while the intermediate frame portion b is supported by the outer holding portion d for rotation about an axis Y—Y. Obviously, however, no adverse effect can be produced even when these axes X—X and Y—Y are reversed.

Figure 2A:
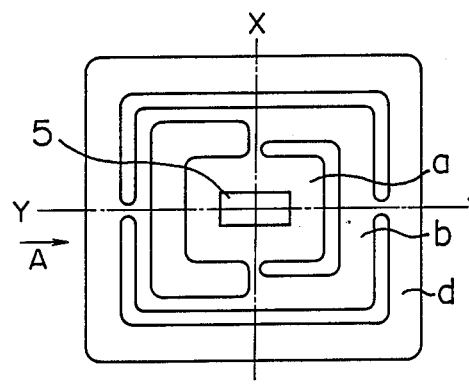
FIGS. 2A–2F are other examples of the gimbal spring incorporated in the magnetic head supporting device of the present invention.
Figure 2B:
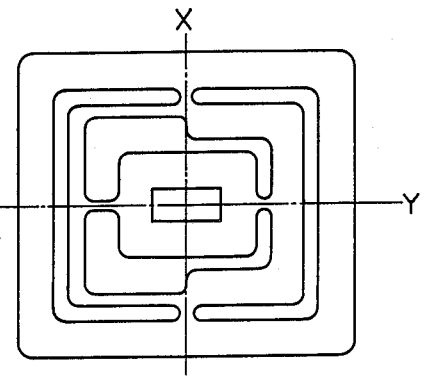

In FIG. 2A, the gimbal spring is substantially the same as that shown in FIG. 1, while in FIG. 2B the gimbal spring is a modification which is obtained by reversing the axes X—X and Y—Y in FIG. 1 with respect to each other.

Figure 2C:
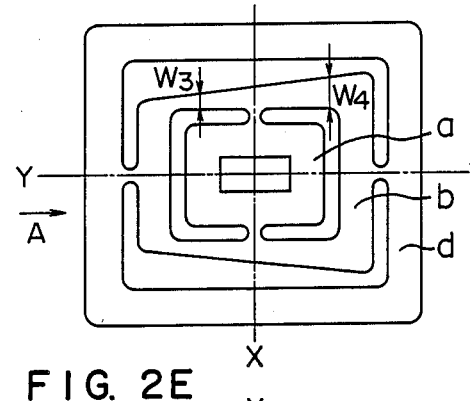
Figure 2D:
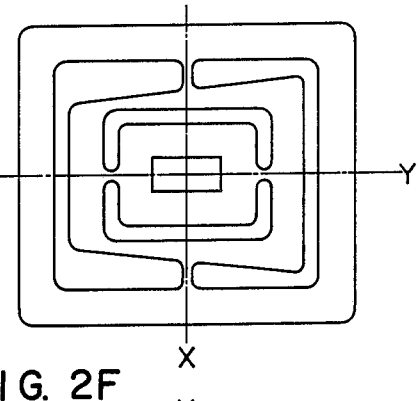
Figure 2E:
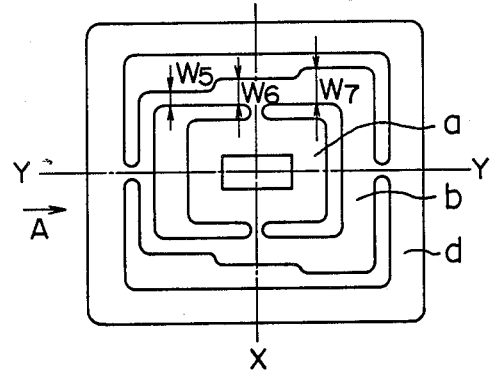
Figure 2F:
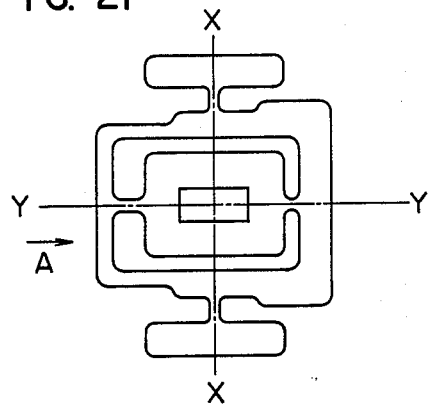

The gimbal spring shown in FIG. 2C is another example of the gimbal spring. In this gimbal spring, the width $W_3$ of the intermediate frame portion b in the upstream half part is smaller than the width $W_4$ in the downstream half part such that the width of the inter frame portion b is gradually increased from the upstream to downstream sides, thus realizing the desired difference in the rigidity between the upstream and downstream portions of the gimbal spring. A gimbal spring shown in FIG. 2D can be obtained by reversing the axes X'X and Y—Y with respect to each other in the gimbal spring shown in FIG. 2G. Still another example of the gimbal spring shown in FIG. 2E has an intermediate frame portion the width of which is increased towards the downstream end thereof in a stepped manner as shown at $W_5$, $W_6$ and $W_7$. In FIG. 2F, there is shown a modification of the gimbal spring shown in FIG. 2E. This modification is obtained by reversing the axes X—X and Y—Y in the gimbal spring shown in FIG. 2E and removing the outer holding portion except for tongue-like portions which are directly connected to the intermediate frame portion through bridges. The outer holding portion is intended only for the purpose of mounting the gimbal spring and, therefore, this portion need not always be rectangular and, in some cases, the shape as shown in FIG. 2F is used suitably. This applies also to the forms of the gimbal spring as shown in FIG. 2A to FIG. 2E.

As will be understood from the foregoing description, according to the invention, the rigidity of the gimbal spring is increased only in the downstream portion thereof without being accompanied by a substantial increase in the rigidity of the whole gimbal spring, by adopting such an asymmetrical arrangement in which the width of the parts of the intermediate frame portion parallel to the direction of running of the magnetic disk is determined to be greater in the downstream portion of the intermediate frame portion than in the upstream portion thereof. In consequence, the tendency for the magnetic head to be inclined during running of the magnetic disk surface is remarkably suppressed so as to ensure a stable contact between the magnetic head and the magnetic disk and, hence, it is possible to improve the electromagnetic conversion efficiency of the magnetic head.

What is claimed is:

1. A magnetic head supporting device for supporting at least one magnetic head making contact with a flexible magnetic disk so as to record and reproduce signals on and from said flexible magnetic disk in a running direction, said magnetic supporting device comprising:
a gimbal spring having one surface side near to said flexible magnetic disc and another surface side remote from said flexible magnetic disc and further having a central portion with a center point to which said magnetic head is secured on said one surface side; and
a pivot making contact with said center portion on said another surface side so as to support said magnetic head through said gimbal spring;
wherein said gimbal spring includes an intermediate frame portion which supports said central portion in such a manner as to impart thereto a degree of freedom of rotation about a first axis passing through said center point orthogonally to said running direction and which has a first portion upstream of said first axis as viewed in the running direction and a second portion downstream of said first axis, said intermediate frame portion having a shape symmetric with respect to a second axis passing through said center point and extending orthogonally to said first axis; and an outer holding portion which supports said intermediate frame portion in such a manner as to impart thereto a degree of freedom of rotation about said second axis, the width of said first portion of said intermediate frame portion, measured along said first axis, being larger than the width of said second portion so that intermediate frame portion is asymmetrical with respect to said first axis such that said gimbal spring has a greater spring stiffness downstream of said first axis than upstream of said first axis as views in the running direction to prevent lifting of the magnetic head from the flexible magnetic disc.

2. A magnetic head supporting device according to claim 1, wherein said pivot is arranged to contact said center portion at said center point.

3. A magnetic head supporting device according to claim 1, wherein said width is linearly changed such that it progressively increases towards the downstream end of said intermediate frame portion.

4. A magnetic head supporting device according to claim 1, wherein said central portion is rectangular.

* * * * *